United States Patent [19]
Uwabata et al.

[11] Patent Number: 5,276,507
[45] Date of Patent: Jan. 4, 1994

[54] MULTIPLEX TV SIGNAL PROCESSING APPARATUS

[75] Inventors: Hideyo Uwabata, Osaka; Yoshio Yasumoto, Nara; Sadashi Kageyama, Hirakata; Shuji Inoue, Moriguchi, all of Japan

[73] Assignee: Matsushita Electric Industrial Co., Ltd., Osaka, Japan

[21] Appl. No.: 671,983

[22] Filed: Mar. 19, 1991

[30] Foreign Application Priority Data
Mar. 23, 1990 [JP] Japan .................. 2-73736

[51] Int. Cl.$^5$ .............................. H04N 9/64
[52] U.S. Cl. ............................ 358/36; 358/905
[58] Field of Search ............... 358/905, 36, 187, 167, 358/37, 166; H04N 9/64

[56] References Cited
FOREIGN PATENT DOCUMENTS
63-36681 2/1988 Japan .
2-121588 5/1990 Japan .

OTHER PUBLICATIONS
Yasumoto et al.; "Extended Definition Television System Using Quadrature Modulation of the Video Carrier with Inverse Nyquist Filter"; Aug. 1987.

Primary Examiner—Alvin E. Oberley
Assistant Examiner—Minsun Oh
Attorney, Agent, or Firm—Wenderoth, Lind & Ponack

[57] ABSTRACT

A multiplex TV signal processing apparatus in a television signal transmitting and receiving system includes an apparatus at the transmitting side which has a first amplitude-modulator for modulating a first carrier by a main signal to obtain a vestigial side-band amplitude-modulated main signal; a second amplitude-modulator for modulating a second carrier but whose frequency is the same as which phase is 90 degree different from the first carrier by a sub signal to obtain a carrier suppressed amplitude-modulated signal; a first inserter for inserting a first ghost canceling reference signal into a horizontal line of the main signal during a vertical blanking period; a second inserter for inserting a second ghost canceling reference signal into the same horizontal line of the sub signal as the first ghost canceling reference signal; and includes an apparatus at the receiving side which has: a first demodulator for demodulating the main signal; a second demodulator for demodulating the sub signal; a ghost canceler for canceling a ghost of the sub signal using the second ghost canceling reference signal; and a crosstalk canceler for canceling the crosstalk of the sub signal from the main signal using the first ghost canceling reference signal.

16 Claims, 12 Drawing Sheets

Ghost Cancelling Reference Signal
(a) sinx/x bar signal
(b) pedestal signal

In-phase GCR =
1/4((F0−F4)
+(F5−F1)
+(F2−F6)
+(F7−F3))

Fig. 11   PRIOR ART
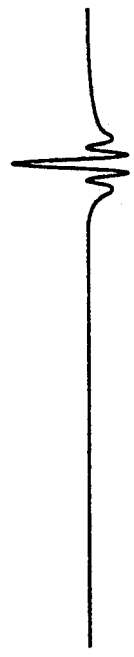
(a) sinx/x signal on the multiplex signal
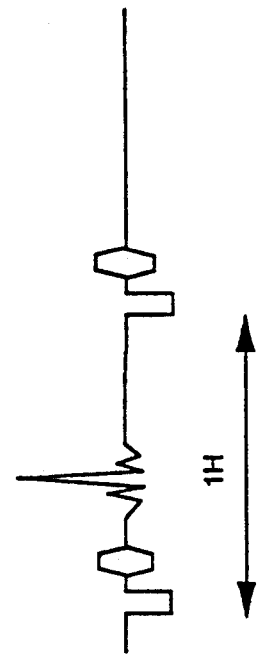
(b) sinx/x signal on the NTSC signal

MULTIPLEX TV SIGNAL PROCESSING APPARATUS

BACKGROUND OF THE INVENTION

1. Field of the Invention

This invention relates to an apparatus for transmitting and receiving an amplitude modulated television signal in which a main ghost cancel reference signal is inserted and a specific signal in which a sub ghost canceling reference signal is inserted and which is multiplexed with the television signal.

2. Description of the Prior Art

More than 30 years have passed since the color television broadcasting of the current NTSC (National Television System Committee) system began in 1960. Recently, in search of a finer definition and higher performance television system, several new systems including the High Definition TV systems have been proposed. At the same time, the contents of the programs presented to viewers have been changed from the mere studio programs to programs providing higher quality images and more realistic feeling such as cinema-size movies.

The current NTSC broadcasting is standardized by 2:1 interlaced 525 scanning lines, luminance signal bandwidth of 4:2 MHz, and aspect ratio of 4:3. (See, for example, Pritchard, "US Color Television Fundamentals-A Review", IEEE Trans. Consumer Electron., vol. CE-23, pp. 467–478, November 1977.)

In this background, several television signal composition methods aiming at compatibility with the current broadcasting system, enhancement of horizontal resolution and extension of the aspect ratio have been proposed. One of such methods is presented in a paper by Yasumoto et al., "An extended definition television system using quadrature modulation of the video carrier with inverse Nyquist filter", IEEE Trans. Consumer Electron., vol. CE-33, pp. 173–180, August 1987. This paper describes a signal superposing method using quadrature modulation of the video carrier. By this method, various signals can be transmitted using a newly established quadrature channel with a very small interference to the conventional NTSC receiver in principle.

One of the big problems with the terrestrial broadcasting is multipath distortion of propagation waves. This problem has attracted much attention of TV viewers recently, because many tall buildings are built and reflect waves in the urban areas. When the quadrature channel is created using the above mentioned method, multipath distortion causes crosstalk between the main NTSC channel and multiplex signal.

In order to solve the multipath distortion, a Ghost Canceling Reference signal may be inserted during one of the vertical blanking lines of the main NTSC signal, as described in a paper by Miyazawa et al, "Development of a Ghost Cancel Reference signal for TV Broadcasting", IEEE Trans. on Broadcasting, Vol. 35, No. 4, December 1989, pp. 339–347. According to this paper, as shown in FIGS. 5 (a), (b) and FIG. 6, a sinx/x rising bar signal and a pedestal signal are inserted in the 18th and 281st horizontal lines by the 8-field sequence method. In FIG. 6, 17th line and 18th line are shown to clarify the advantage of the 8-field sequence GCR signal. In order to obtain the GCR signal from continuous 8 fields at the reception side, one can follow the equation:

$$GCR = \tfrac{1}{8}[(F0-F4)+(F5-F1)+(F2-F6)+(F7-F3)] \quad (1)$$

where FX (X=0,1,2, . . . ,7) denotes Xth field signal.

If the image signal includes no motion in the 17th line (although normally there is no image signal in this line), this calculation cancels video signal, horizontal synchronous signal, and color sub-carrier, leading to get a pure GCR signal transmitted with a multipath distortion if any.

Quadrature modulation of the video carrier is one of the excellent techniques to keep the compatibility with the conventional TV broadcast. However, there arises crosstalk between two channels caused by a channel distortion and imperfectness of demodulation at the reception side. There is actually multipath distortion, or ghosts. In order to reduce multipath distortion with quadrature modulation, it is already proposed to insert Ghost Canceling Reference (GCR) signals into both of the NTSC and multiplex signals. For example, see a paper by Kageyama et al, "An NTSC Compatible Wide Screen Television System with Evolutionary Extendibility", IEEE Trans. on Consumer Electronics, Vol. CE-34, No. 3, August, 1988. According to this paper, as shown in FIG. 11, sinx/x GCR signals are inserted into horizontal lines during the vertical blanking period. In this case two horizontal lines are required for transmitting the GCR signals, one line for transmitting the main GCR signal and no signal for the multiplex channel, and the other for transmitting the multiplex GCR signal and black burst for the main channel. A disadvantage of this method is that this consumes two horizontal lines in each vertical blanking period.

FIG. 10 is a block diagram showing a 2-dimensional waveform equalizer suitable for equalizing the main NTSC signal and multiplex signal. This equalizer, consisting of four sets of series of multipliers, two sets of series of adders, and two series of delay lines, accepts and equalizes both the main NTSC signal and multiplex signal. Both signals generate tap weights, referring to themselves and counterpart, and compensate for ghosts caused by themselves and crosstalk from counterparts. All tap coefficients are provided by a control unit (not shown) after calculations referred to the GCR signals.

SUMMARY OF THE INVENTION

It is a primary object of this invention to provide a multiplexed TV signal processing apparatus using quadrature modulation of a video carrier for multiplex transmission in a limited bandwidth without interference to the current receiver.

According to this invention, a multiplex GCR signal for a multiplex signal is inserted into the same horizontal line as the line in which a main GCR signal of the conventional standard is inserted to save channel capacity without changing the conventional NTSC TV standard including the main GCR signal.

Using quadrature modulation of the video carrier, one can transmit a side panel signal of a wide screen image, a high frequency component of a luminance signal, or a digital PCM sound as a multiplex signal. At the same time, at the conventional TV receiver, one can continue receiving the conventional picture without interference from the multiplex signal. One can reduce the crosstalk between two signals and realize a TV signal processing apparatus transmitting a multiplex signal in an efficient way. Even if an incompleteness of such circuits as filters and modulators occurs, the crosstalk of the main signal into the multiplex signal can be reduced to a practically negligible level.

According to this invention, a multiplexed TV signal processor at a transmitter side includes, an NTSC (or conventional) composite signal source which generates an NTSC (or conventional) signal with a field-sequence main GCR signal inserted in a horizontal line within a vertical blanking period, and a multiplex signal source which generates a multiplex signal with a corresponding field-sequence sub GCR signal inserted in the same horizontal line as that of the NTSC composite signal in which the main GCR signal is inserted.

The NTSC composite signal amplitude-modulates a main video carrier to become a vestigial sideband (VSB) signal, and the multiplex signal amplitude-modulates a carrier which is the same in frequency as and shifted in phase by 90 degrees from the main carrier to become a double sideband carrier suppressed amplitude-modulated signal. The modulated multiplex signal passes through an inverse Nyquist filter to become a vestigial sideband (VSB) signal, and then superposed on the modulated main signal to become a multiplexed signal, which is transmitted.

A multiplexed TV signal processor at a receiver side has a synchronous detector for demodulating the main NTSC signal and the multiplex signal, and an multiplex ghost canceler comprising a 2-dimensional transversal filter, a GCR signal detector and a coefficient canceler. In the multiplex ghost canceler, the GCR signal detector detects both GCR signals inserted into the NTSC signal and the multiplex signal, and obtains the crosstalk from the NTSC signal to the multiplex signal and the ghosts of the multiplex signal. The coefficient calculator calculates all coefficients of the 2-dimensional transversal filter to reduce the ghosts and crosstalk.

By this constitution, it is possible to obtain not only the conventional television broadcasting images but also the multiplex signal at the receiver without crosstalk between them. Especially, it can be stressed that the advantage of this invention is saving of channel capacity because both GCR signals are inserted into the same horizontal line during the vertical blanking period.

BRIEF DESCRIPTION OF THE DRAWINGS

FIGS. 11 (a) and (b) show an example of ghost canceling reference signals of NTSC signal and multiplex signal through quadrature channel as in the prior art.

DETAILED DESCRIPTION OF THE PREFERRED EMBODIMENTS

Figure 1A:
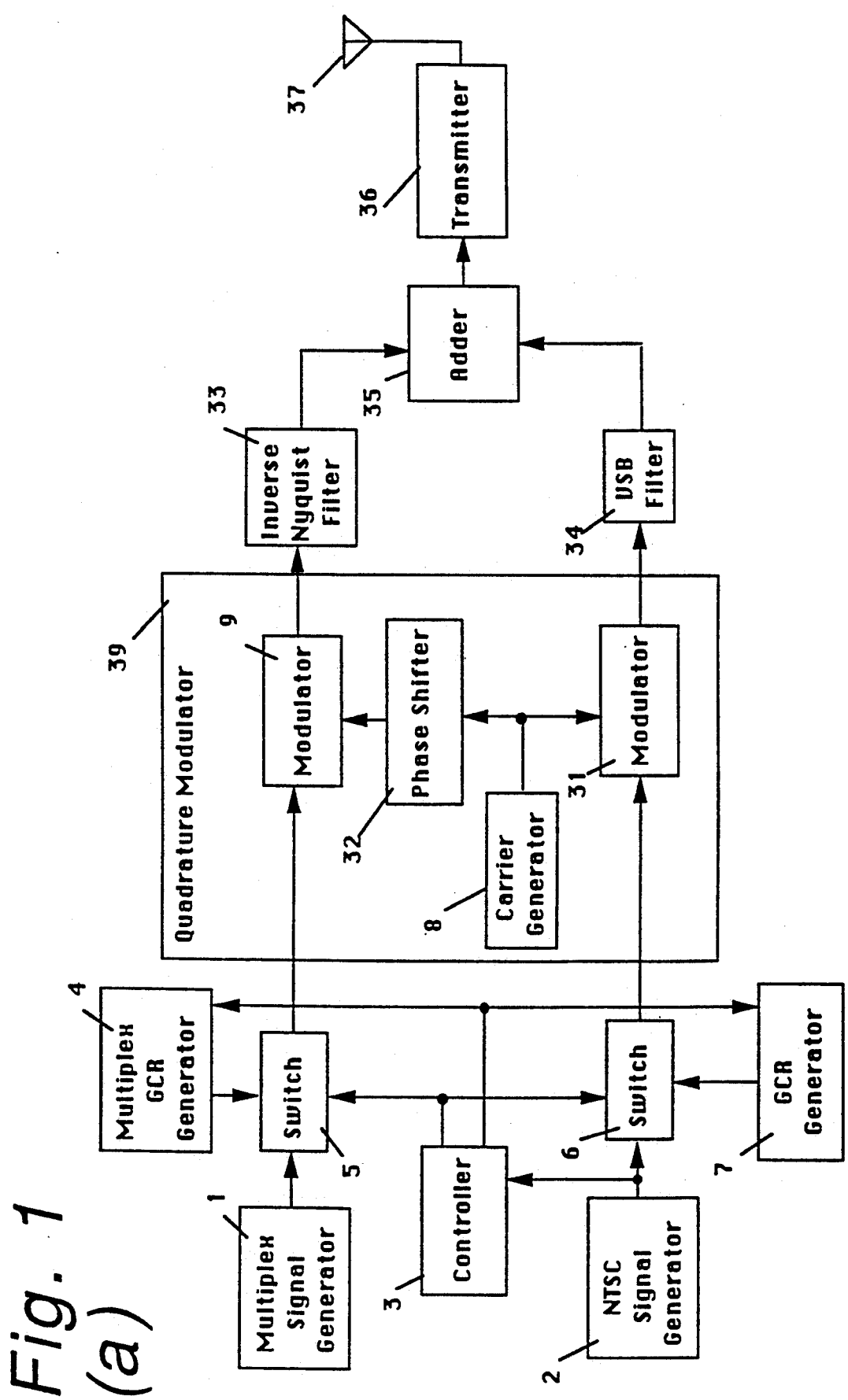
FIGS. 1(a)-1(b) are block diagrams showing a multiplexed TV signal processing apparatus at the transmission side embodying this invention.

FIG. 1 (a) is a block diagram showing a multiplexed TV signal processing apparatus at the transmission side in accordance with an embodiment of this invention. In this figure a multiplex signal generator 1 generates a multiplex signal having a frequency band of about 1 MHz without a DC component. A high frequency component of the luminance signal or a high frequency component of the side panels corresponds to the multiplex signal. An NTSC signal generator 2 generates an NTSC composite signal, or an NTSC encoded signal. Two different GCR signals from a main GCR generator 7 and a multiplex GCR generator 4 are respectively inserted to the NTSC composite signal and the multiplex signal through switches 5 and 6 controlled by a controller 3. A horizontal line during the vertical blanking period is used for this insertion. How to control those switches will be described later. These NTSC and multiplex signals with GCR signals are quadrature modulated at a quadrature modulator consisting of modulators 9 and 31, a phase shifter 32, and a carrier generator 8. A carrier is generated at the carrier generator 8 and supplied to both modulators, one directly to the modulator 31 and one after 90 degree phase shifted through the phase shifter 32. The modulated NTSC composite signal and the modulated multiplex signal are added by an adder 35 after passing through a VSB filter 34 and an inverse Nyquist filter 33, respectively. From the adder a composite RF modulated signal is obtained and transmitted through a transmitter and an antenna.

Figure 1B:
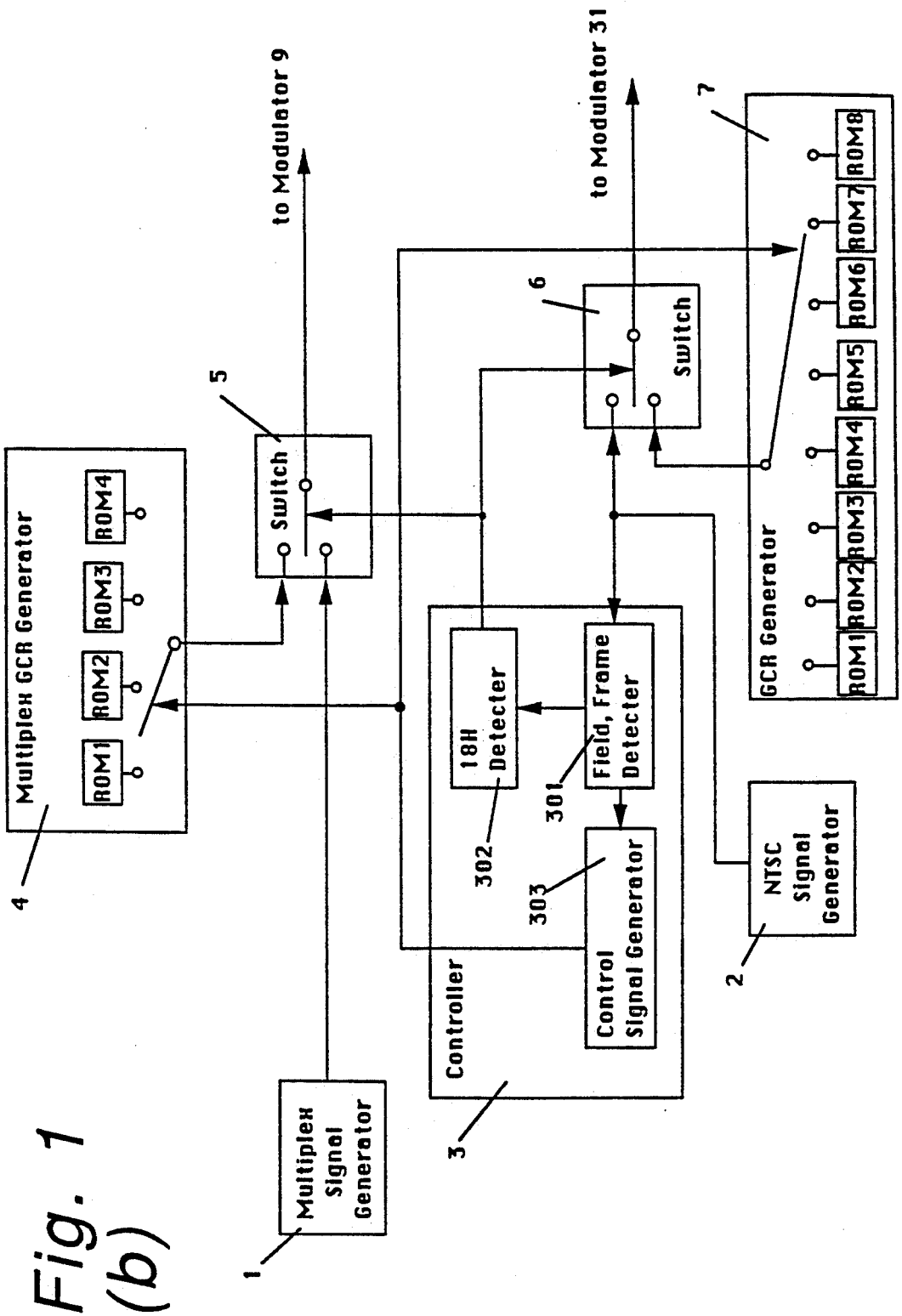

FIG. 1(b) shows how to control the switches 5 and 6, and two GCR generators 4 and 7 by the controller 3. A field, frame detector 301 in the controller 3 finds the first frame or second frame, and the first field or second field of each frame from an inputted NTSC composite signal. Referring to a burst signal on the back porch of the NTSC composite signal, it can decide the start of the first field of the first frame. An 18H detector 302 can find the position of the 18th line and outputs a control signal for the two switches to switch to allow the GCR signals to be inserted. A control signal generator 303 generates a field selecting signal to select ROMs (Read Only Memories) inside the GCR generator 7 and the multiplex GCR generator 4 to generate 8-field or 4-field sequence GCR signals.

Figure 2:
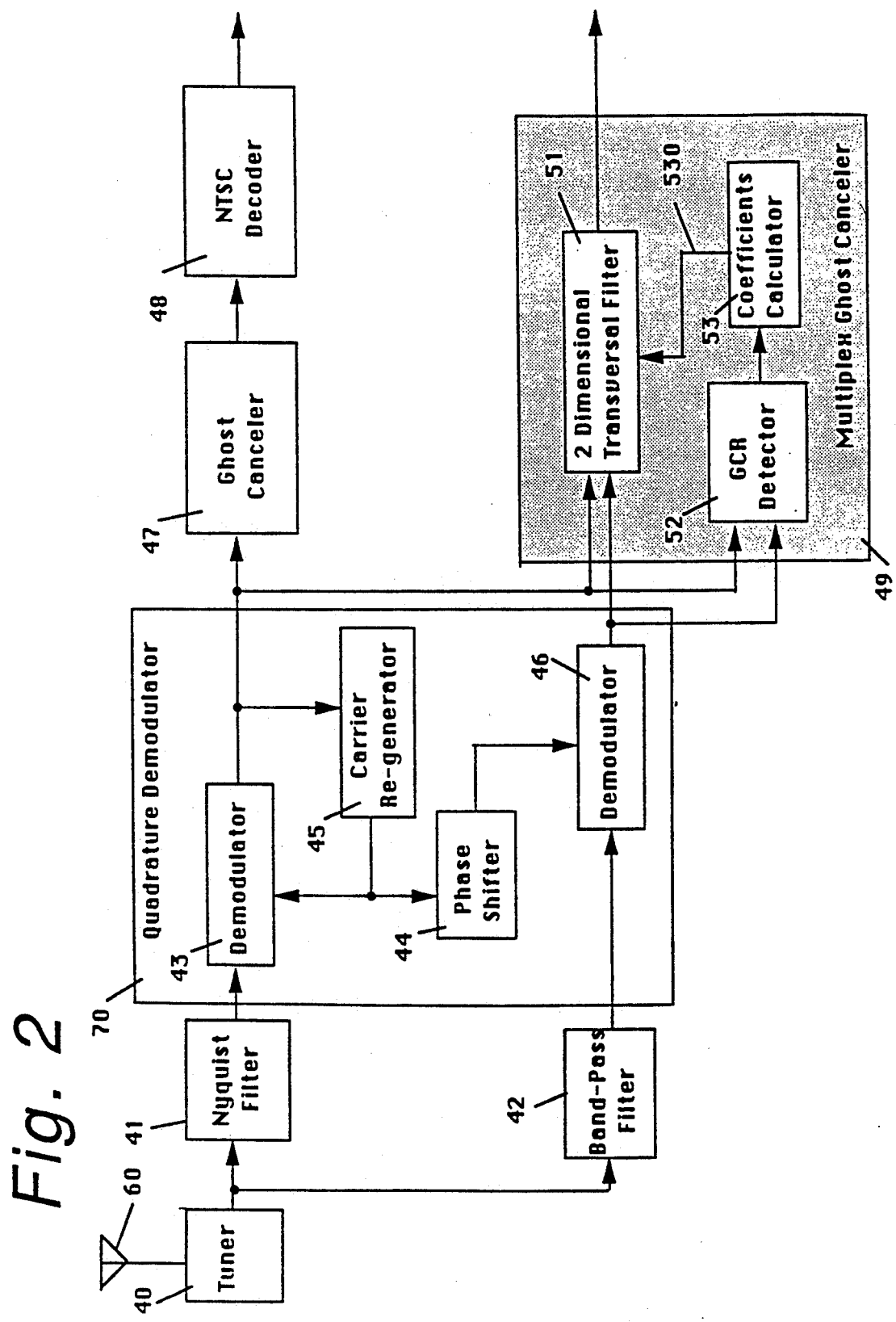
FIG. 2 is a block diagram showing a multiplexed TV signal processing apparatus at the reception side embodying this invention.

FIG. 2 is a block diagram showing a multiplexed TV signal receiving apparatus receiving the signal transmitted from the transmitting apparatus shown in FIG. 1(a) in accordance with an embodiment of this invention. This receiver receives the composite RF modulated signal through an antenna and a tuner and regenerates an original NTSC signal and an original multiplex signal. The composite RF signal is inputted into a Nyquist filter 41 and a band-pass filter 42. A quadrature demodulator consists of a carrier re-generator 45, demodulators 43 and 46, and a phase shifter 44. An NTSC composite signal and a multiplex signal are obtained at the demodulator 43 and the demodulator 46, respectively.

The demodulated NTSC composite signal is introduced into a ghost canceler 47, if necessary, and then into an NTSC decoder. Luminance and chrominance signals without ghosts are obtained from the NTSC decoder.

Figure 10:
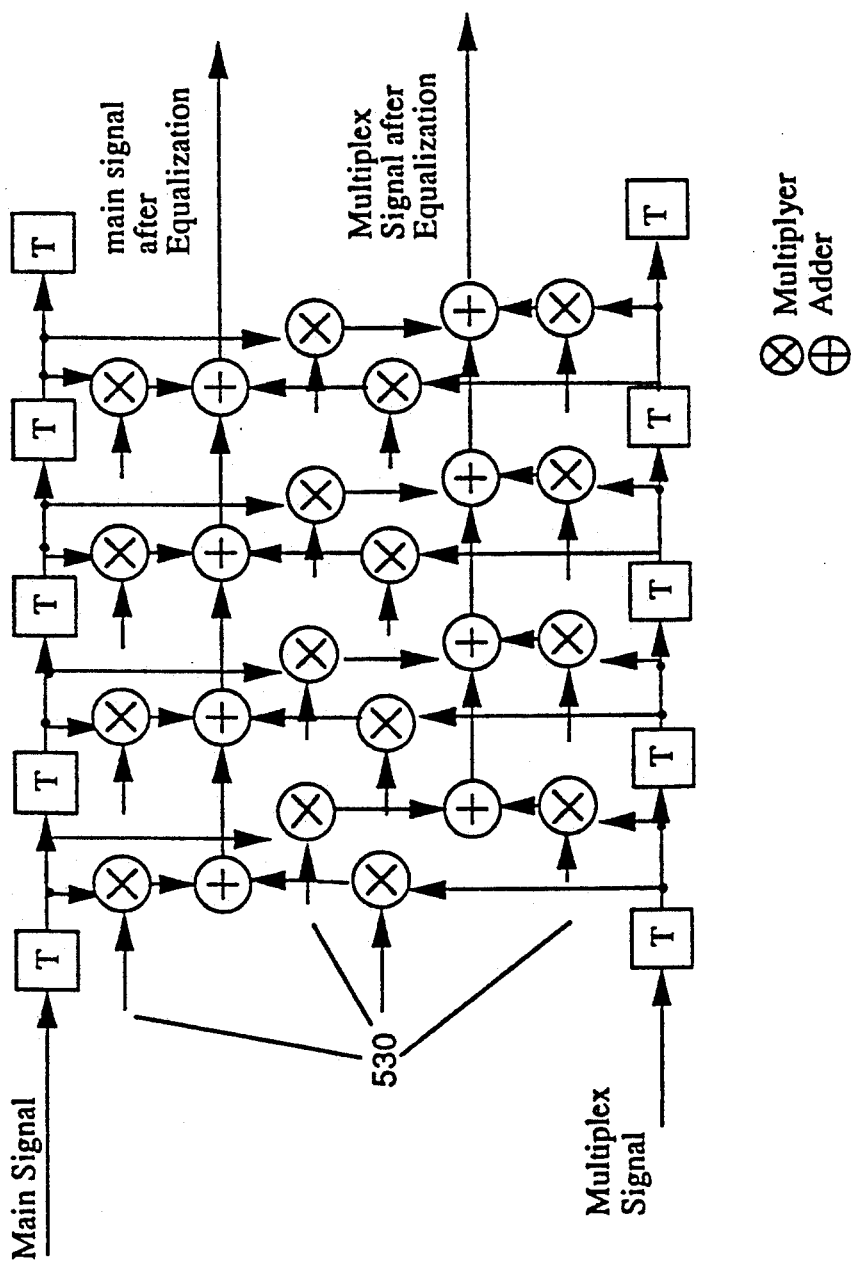
FIG. 10 is a block diagram showing a 2-dimensional waveform equalizer as in the prior art.

On the other hand, the demodulated multiplex signal is introduced into a multiplex ghost canceler 49 and ghost of itself and crosstalk from the NTSC signal are eliminated. The multiplex ghost canceler consists of a 2-dimensional transversal filter 51, a GCR detector 52 and a coefficient calculator 53, extracts the GCR signals from the specific horizontal line following a predetermined equation which will be described later, and calculates coefficients 530 for multipliers of the 2-dimensional transversal filter. The coefficients 530 are introduced to the 2-dimensional transversal filter. The details of the 2-dimensional transversal filter is shown in FIG. 10. Both of the NTSC composite and multiplex signals are fed to the 2-dimensional transversal filter, and ghosts of the multiplex signal and crosstalk from the NTSC composite signal to the multiplex signal are reduced or eliminated.

Figure 7:
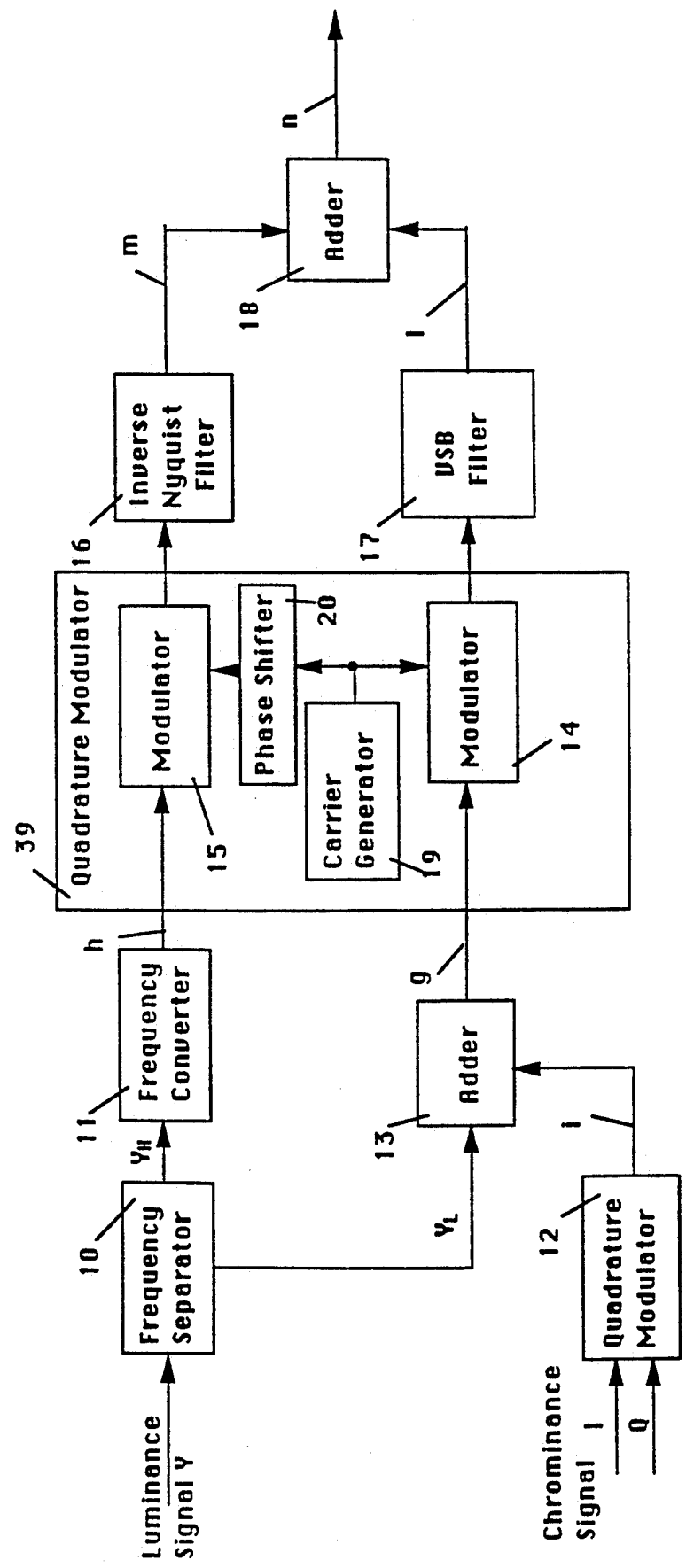
FIG. 7 a block diagram showing a multiplexed TV signal processing apparatus at the transmission side using quadrature amplitude modulation as in the prior art.
Figure 9:
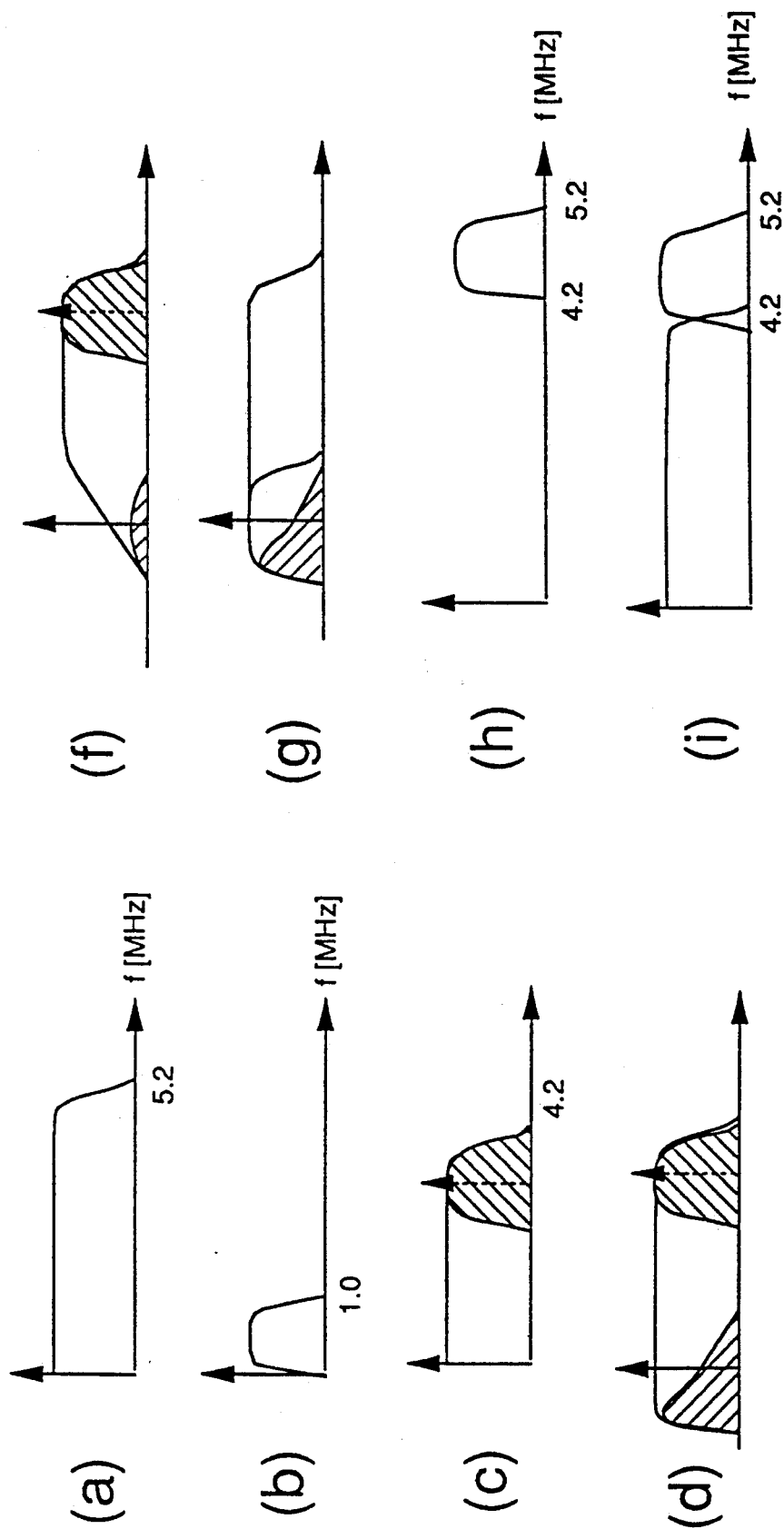
FIGS. 9(a)-(b) show various frequency spectrum in the multiplexed TV signal processing apparatus using quadrature amplitude modulation as in the prior art.

An example of quadrature modulation method applied to a multiplexed TV signal transmitting apparatus is shown in FIG. 7. In this example high frequency components of luminance signal is transmitted using quadrature modulation of the video carrier. Referring to FIG. 7, the input signals are luminance signal Y and chrominance signals (or called color difference signals) I and Q, and the output signal is a composite RF modulated signal shown by "n". The input luminance signal Y is separated by a frequency separator 10 to a low frequency component YL having a frequency band below 4.2 MHz, and a high frequency component YH having a frequency band from 4.2 MHz to 5.2 MHz. On the other hand, the input chrominance signals I and Q are quadrature modulated at a quadrature modulator 12 usually using a sub-carrier fsc having a frequency of about 3.58 MHz, and added with the low frequency component of luminance signal YL at an adder 13 to become an NTSC composite signal shown by "g". This processing is exactly following the "NTSC encoding". The high frequency component of luminance signal YH is frequency converted at a frequency converter 11 to become a multiplex signal shown by "h", having a frequency band from DC to 1.0 MHz. This multiplex signal h and the NTSC composite signal shown by g are quadrature modulated at modulators 14 and 15 by video carriers cos ωt and sin ωt. The modulated multiplex signal and the modulated NTSC signal pass through an inverse Nyquist filter 16 and a VSB filter 17, respectively, and then added to each other by an adder 18 to become the composite RF modulated signal n. Frequency spectrums of luminance signal Y, multiplex signal h, NTSC signal g, and composite RF modulated signal n, are shown in FIGS. 9(a), (b), (c) and (d), respectively.

Figure 8:
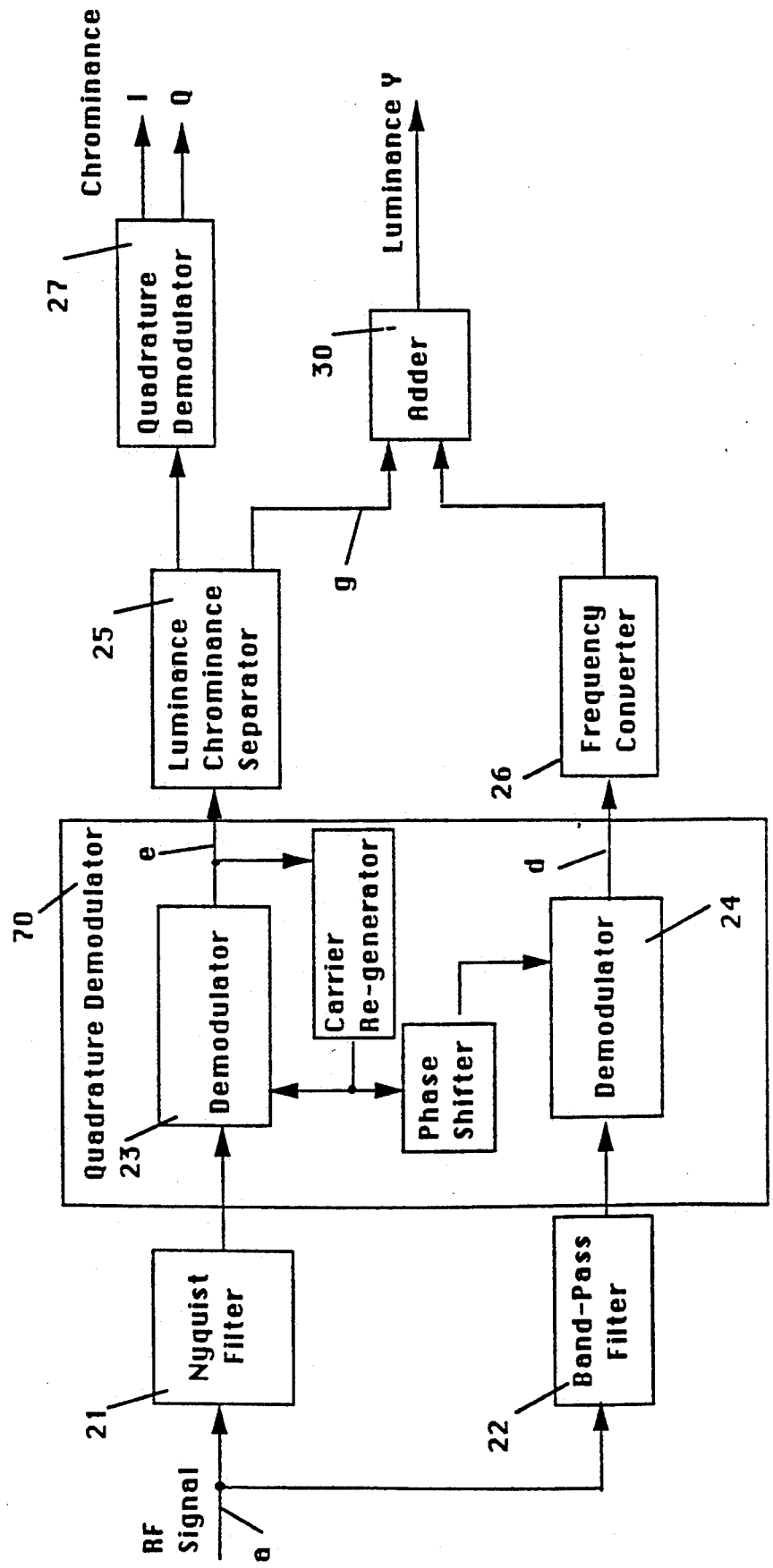
FIG. 8 is a block diagram showing a multiplexed TV signal processing apparatus at the reception side using quadrature amplitude modulation as in the prior art.

FIG. 8 is a block diagram showing a multiplexed TV signal receiving apparatus receiving the signal transmitted from the transmitting apparatus shown in FIG. 7. In FIG. 8, the input signal is the composite RF modulated signal shown by "a", and the output signals are luminance signal Y and chrominance signals I and Q. The input composite RF modulated signal is introduced into both of a Nyquist filter 21 and a band-pass filter 22. Frequency spectrums of the outputs of the Nyquist filter 21 and the band-pass filter 22 are shown in FIGS. 9(f) and (g). These output signals are fed to a quadrature demodulator comprising demodulators 23 and 24 and quadrature demodulated by carriers sin ωt and cos ωt. A demodulated multiplex signal shown by "d" is further introduced into a frequency converter 26, which frequency spectrum is shown in FIG. 9(h). A demodulated NTSC signal shown by "e" goes to a luminance chrominance separator 25. A luminance signal "g" is obtained from an output of the separator 25, and chrominance signals I and Q are obtained from a quadrature demodulator 27. The luminance signal "g" is added to the frequency converted high frequency component of luminance signal from frequency converter 26 by an adder 30 to become an original wide band luminance signal Y.

Figure 3:
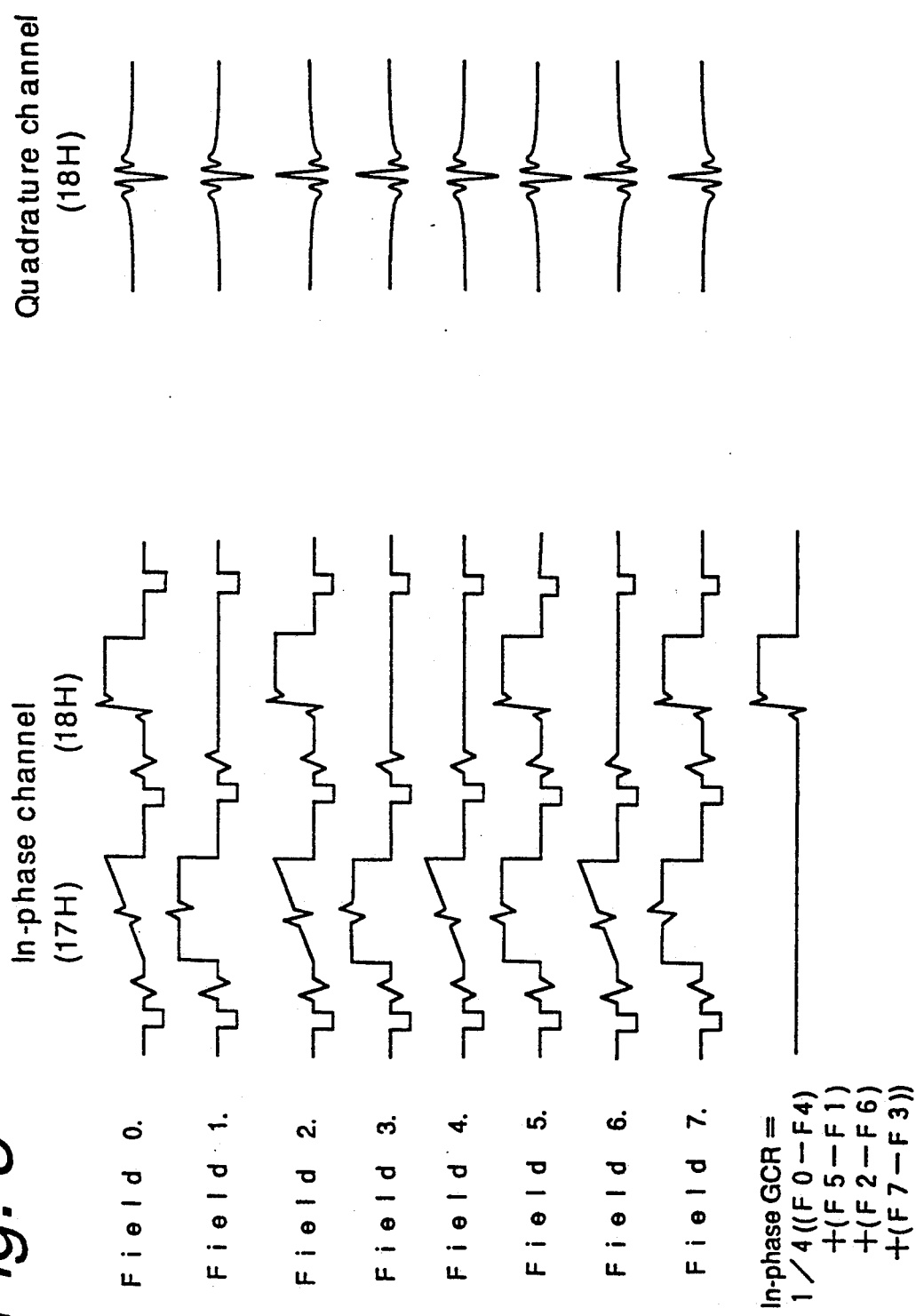
FIG. 3 and 4 show examples of waveforms of ghost canceling reference signals for a main NTSC signal and a multiplex signal embodying this invention.

FIG. 3 is the first embodiment in use for the GCR signals in this multiplexed TV signal processing apparatus. In this figure, the left side waveform captioned with "in-phase channel" shows a conventional standard used in Japan, and the right figure shows a GCR signal for the multiplex signal through a quadrature channel. In each of the in-phase and quadrature channels, the GCR signals are inserted in the 18th horizontal lines in the vertical blanking periods. The GCR signal for quadrature channel has 4-field sequence and consists of plus and minus sinx/x signal whose bandwidth is about 1 MHz. This GCR signal has no DC component (suitable for quadrature channel) and its sequence is minus, minus, plus and plus as shown in this figure. When the conventional ghost canceler accepts the composed RF modulated signal including quadrature modulation with GCR signals, and calculates the GCR signal following the equation (1), the crosstalk from the multiplex GCR signal to the main GCR signal is canceled due to the field sequence characteristics of GCR signal for the multiplex signal. This means quadrature modulation with new GCR signals has the compatibility with the conventional ghost canceling TV.

When one calculates the crosstalk from the NTSC signal to the multiplex signal, one simply follows the equation:

$$\text{Crosstalk} = (F0+F2) \text{ or } (F5+F7) \qquad (2)$$

This calculation can cancel the ghosts of the multiplex signal. When one calculates the ghosts of the multiplex signal itself, one can follow the next equation:

$$\text{Ghost of Multiplex signal} = (F3-F1) \text{ or } (F6-F4) \qquad (3)$$

This calculation can cancel the crosstalk from the NTSC signal to the multiplex signal.

The alternative way of this calculation is:

$$\text{Ghost or Multiplex signal (a)} = (F2-F0) \text{ or } (F7-F5) \qquad (4)$$

Or, a part of equations (3), (4) or combinations of these equations may also be used.

These calculations can be done at the GCR detector 52 in FIG. 2.

Figure 4:
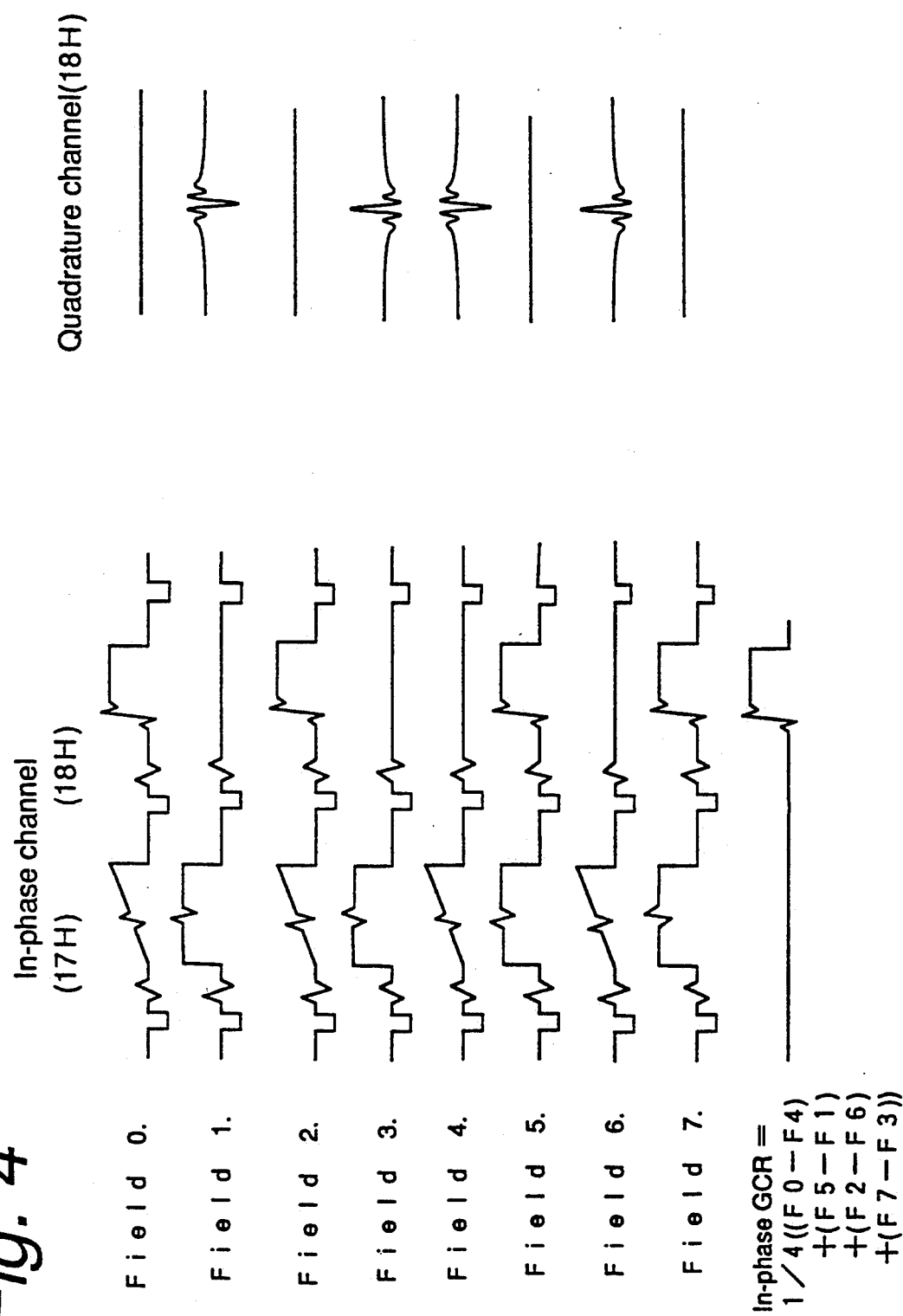
Figure 5:
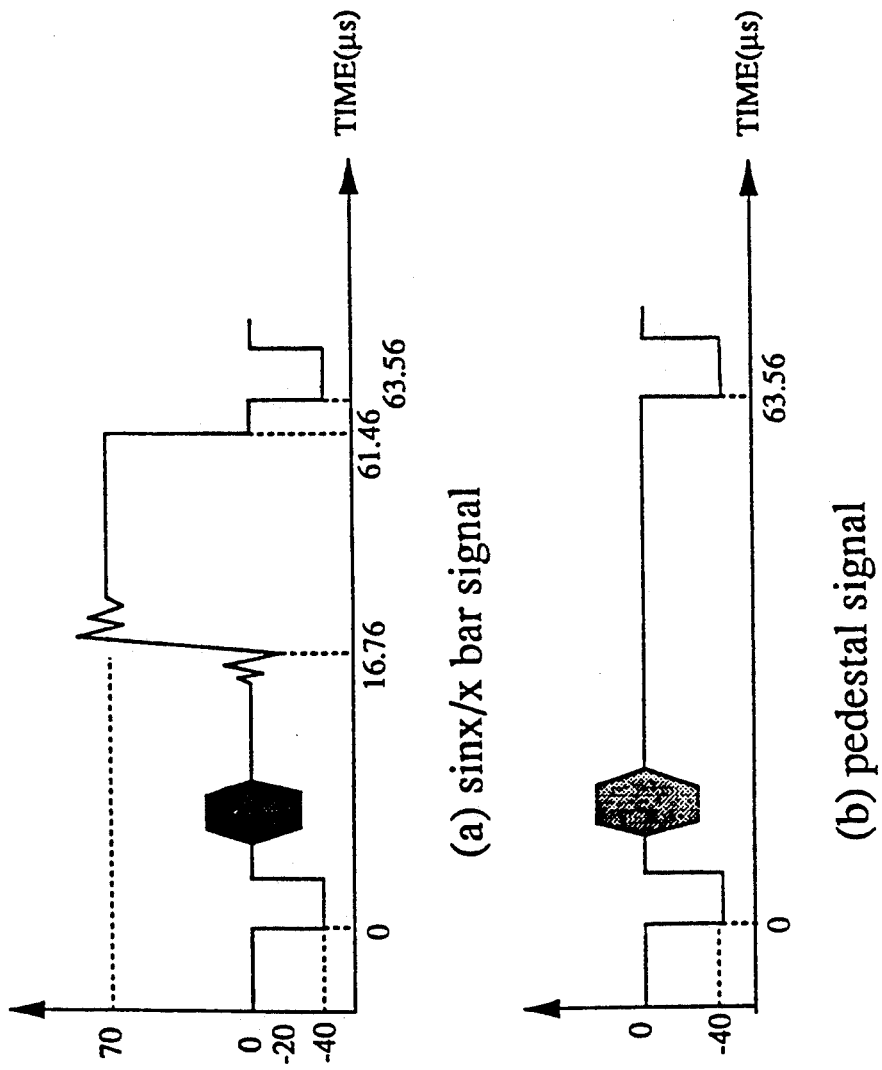
FIGS. 5(a) and (b) and 6 show the details of ghost canceling reference signal inserted into a main NTSC signal as in the prior art.
Figure 6:
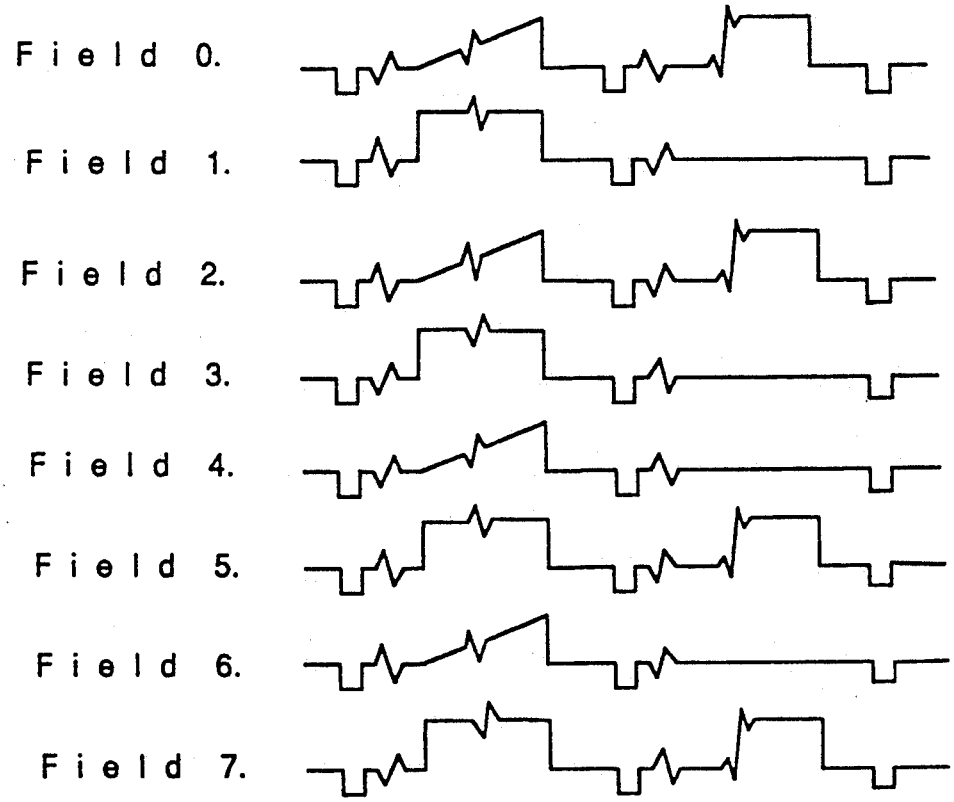

FIG. 4 is the second embodiment in use for the GCR signals in this multiplex TV signal processing apparatus. In this figure, the left side waveform captioned with "in-phase channel" shows a conventional standard used in Japan, and the right figure shows a GCR signal for the multiplex signal through quadrature channel. In each of the in-phase and quadrature channels, the GCR signals are inserted in the 18th horizontal lines in the vertical blanking periods. The GCR signal for quadrature channel has a 4 field sequence and consists of a plus and a minus sinx/x signal and no signal whose bandwidth is about 1 MHz. This GCR signal has no DC component (suitable for quadrature channel) and its sequence is no signal, minus, no signal, and plus as shown in this figure. When the conventional ghost canceler accepts the composed RF modulated signal including quadrature modulation with GCR signals, and calculates the GCR signal following the equation (1), the crosstalk from the multiplex GCR signal to the main GCR signal is canceled due to the field sequence characteristics of GCR signal for the multiplex signal. This means quadrature modulation with new GCR signals has the compatibility with the conventional ghost canceling TV.

When one calculates the crosstalk from the NTSC signal to the multiplex signal, one simply looks at the 18th line of the multiplex signal in field 0, field 2, field 5, field 8, or a combination of these fields.

When one calculates the ghost of the multiplex signal itself, one looks at the 18th line of the multiplex signal in field 3, field 6, field 1, or field 4. In these field there is no crosstalk from the NTSC signal to the multiplex signal. The calculation is done at the GCR detector 52 in FIG. 2.

As described above, it is clear that this invention is very useful in terms of industrialization of the technique of quadrature modulation of the video carrier, because this invention enables the multiplex signal transmitted through quadrature modulation to be demodulated correctly and efficiently even under the severe situations such as multipath propagation. Furthermore, using this invention one can achieve a compatible method to transmit the multiplex signal with the conventional ghost canceling standard as well as the conventional NTSC TV standard, leading to the efficient usage of wave resources.

What is claimed is:

1. A multiplex TV signal processing apparatus comprising:
   a first signal source for generating an NTSC composite signal;
   a second signal source for generating a multiplex signal which has no DC component;
   a first signal generating means for generating a first ghost canceling reference signal whose waveform consists of more than one different unit reference signals and which is sequentially composed from said unit reference signals according to four field sequences of said NTSC composite signal;
   a second signal generating means for generating a second ghost canceling reference signal whose waveform consists of more than one different unit reference signals and which is sequentially composed from said unit reference signals according to said first ghost canceling reference signal;
   a first inserting means for inserting said first ghost canceling reference signal into a horizontal line during a vertical blanking period of said NTSC composite signal to obtain a ghost canceling reference signal inserted NTSC composite signal;
   a second inserting means for inserting said second ghost canceling reference signal into the same horizontal line during said vertical blanking period of said multiplex signal as said horizontal line during said vertical blanking period of said NTSC composite signal to obtain a ghost canceling reference signal inserted multiplex signal;
   a first signal modulating means for modulating said ghost canceling reference signal inserted NTSC composite signal with a first video carrier to obtain a first vestigial sideband, amplitude-modulated signal;
   a second signal modulating means for modulating said ghost canceling reference signal inserted multiplex signal with a second video carrier which is the same in frequency as and different in phase by 90 degrees from said first video carrier to obtain a carrier suppressed double sideband amplitude-modulated signal;
   an inverse Nyquist filter having a Nyquist characteristic for filtering said carrier suppressed double sideband amplitude-modulated signal to obtain a second vestigial sideband, amplitude-modulated signal;
   an adding means for adding said first and second vestigial sideband, amplitude-modulated signals to obtain a composite RF signal; and
   a transmitting means for transmitting said composite RF signal.

2. A multiplex TV signal processing apparatus for processing TV signals to produce a composite RF modulated signal comprising:
   a first inserting means for inserting a first ghost canceling reference signal into a horizontal line during a vertical blanking period of a main signal to obtain a ghost canceling reference signal inserted main signal;
   a second inserting means for inserting a second ghost canceling reference signal into the same horizontal line during a vertical blanking period of a multiplex signal as said horizontal line during said vertical blanking period of said main signal to obtain a ghost canceling reference signal inserted multiplex signal;
   a first signal modulating means for modulating said ghost canceling reference signal inserted main signal with a first video carrier to obtain a first vestigial sideband, amplitude-modulated signal;
   a second signal modulating means for modulating said ghost canceling reference signal inserted multiplex signal with a second video carrier which is the same in frequency as and different in phase 90 degrees from said first video carrier to obtain a carrier suppressed amplitude-modulated signal;
   an inverse Nyquist filter having a Nyquist characteristic for filtering said carrier suppressed double sideband amplitude-modulated signal to obtain a second vestigial sideband, amplitude-modulated signal; and
   an adding means for adding said first and second vestigial sideband, amplitude-modulated signals to obtain a composite RF modulated signal.

3. An apparatus according to claim 2, wherein said first ghost canceling reference signal consists of a sinx/x rising bar in fields 1, 3, 6, and 8 and a pedestal signal in fields 2, 4, 5, and 7.

4. An apparatus according to claim 2, wherein said second ghost canceling reference signal consists of a positive polarity signal in fields 1 and 2 and a negative polarity signal in fields 3 and 4.

5. An apparatus according to claim 2, wherein said second ghost canceling reference signal consists of a sinx/x in fields 3 and 4 and a-sinx/x in fields 1 and 2.

6. An apparatus according to claim 2, wherein said second ghost canceling reference signal consists of a positive polarity signal in field 2, a negative polarity signal in field 4, and no signal in fields 1 and 3.

7. An apparatus according to claim 2, wherein said second ghost canceling reference signal consists of a sinx/x in field 4 a-sinx/x in field 2, and no signal in fields 1 and 3.

8. A multiplex TV signal processing apparatus for processing a composite RF modulated signal in which a main signal containing a first ghost canceling reference signal and a multiplex signal containing a second ghost canceling reference signal are quadrature modulated, comprising:
  a first signal demodulating means for demodulating said main signal;
  a second signal demodulating means for demodulating said multiplex signal; and
  a canceling means for canceling ghosts of said multiplex signal and crosstalk from said main signal to said multiplex signal, which comprises:
    a detecting means for detecting said first ghost canceling reference signal from a horizontal line during a vertical blanking period of said main signal demodulated by said first signal demodulating means and for detecting said second ghost canceling reference signal from said horizontal line during said vertical blanking period of said multiplex signal demodulated by said second signal demodulating means and for calculating a ghost of said multiplex signal and a crosstalk from said main signal to said multiplex signal by using said first and second detected ghost canceling reference signals, and
    a crosstalk and ghost canceling means for receiving said main signal and said multiplex signal for canceling ghosts of said multiplex signal and crosstalk from said main signal to said multiplex signal by using said calculated ghost of said multiplex signal and said calculated crosstalk from said main signal to said multiplex signal.

9. An apparatus according to claim 8, wherein said first ghost canceling reference signal consists of a sinx/x rising bar in fields 1, 3, 6, and 8 and a pedestal signal in fields 2, 4, 5, and 7.

10. An apparatus according to claim 8, wherein said second ghost canceling reference signal consists of a positive polarity signal in fields 1 and 2 and a negative polarity signal in fields 3 and 4.

11. An apparatus according to claim 8, wherein said second ghost canceling reference signal consists of a sinx/x in fields 3 and 4 and a-sinx/x in fields 1 and 2.

12. An apparatus according to claim 8, wherein said second ghost canceling reference signal consists of a positive polarity signal in field 2, a negative polarity signal in field 4, and no signal in fields 1 and 3.

13. An apparatus according to claim 8, wherein said second ghost canceling reference signal consists of a sinx/x in field 4, a-sinx/x in field 2, and no signal in fields 1 and 3.

14. An apparatus according to claim 8, wherein a crosstalk canceling means detects crosstalk by summation of fields 1 and 3, or by summation of fields 6 and 8, or by summation of fields 1 and 3 and 6 and 8, and a ghost canceling means detects ghosts by differentiation between fields 2 and 4, or differentiation between fields 5 and 7, or differentiation between fields 2 and 4 and 5 and 7.

15. An apparatus according to claim 8, wherein a crosstalk canceling means detects crosstalk by calculations of signals inserted in one or more of field 1, field 3, field 6 and field 8, and a ghost canceling means detects ghosts by calculations of signals inserted in one or more of field 2, field 4, field 5 and field 7.

16. A multiplex TV signal processing apparatus in a television signal receiving system for receiving a composite RF signal in which an NTSC composite signal containing a first ghost canceling reference signal and a multiplex signal containing a second ghost canceling reference signal are quadrature modulated, comprising:
  a first signal demodulating means for demodulating said NTSC composite signal;
  a second signal demodulating means for demodulating said multiplex signal; and
  a canceling means for canceling ghosts of said multiplex signal and crosstalk from said NTSC composite signal to said multiplex signal, which comprises:
    a detecting means for detecting said first ghost canceling reference signal from a horizontal line during a vertical blanking period of said NTSC composite signal demodulated by said first signal demodulating means and for detecting said second ghost canceling reference signal from said horizontal line during said vertical blanking period of said multiplex signal demodulated by said second signal demodulating means and for calculating a ghost of said multiplex signal and a crosstalk from said NTSC composite signal to said multiplex signal by using said first and second detected ghost canceling reference signals, and
    a crosstalk and ghost canceling means for receiving said NTSC composite signal and said multiplex signal for canceling ghosts of said multiplex signal and crosstalk from said NTSC composite signal to said multiplex signal by using said calculated ghost of said multiplex signal and said calculated crosstalk from said NTSC composite signal to said multiplex signal.

* * * * *